US008444124B2

(12) United States Patent
Fueki et al.

(10) Patent No.: US 8,444,124 B2
(45) Date of Patent: May 21, 2013

(54) ENGINE NATURAL VIBRATION FREQUENCY DETECTION METHOD, ACTIVE VIBRATION ISOLATION SUPPORT DEVICE CONTROL METHOD, ENGINE NATURAL VIBRATION FREQUENCY DETECTION APPARATUS, ACTIVE VIBRATION ISOLATION SUPPORT DEVICE CONTROL APPARATUS, ACTIVE VIBRATION ISOLATION SUPPORT DEVICE, AND VIBRATION FREQUENCY DETECTION APPARATUS FOR VIBRATING BODY

(75) Inventors: Shungo Fueki, Saitama (JP); Tetsuya Ishiguro, Saitama (JP); Hiroaki Ue, Saitama (JP); Hirotomi Nemoto, Saitama (JP); Tatsuhiro Yone, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1287 days.

(21) Appl. No.: 12/228,246

(22) Filed: Aug. 11, 2008

(65) Prior Publication Data

US 2009/0045560 A1    Feb. 19, 2009

(30) Foreign Application Priority Data

Aug. 15, 2007 (JP) ................................. 2007-211729
Aug. 15, 2007 (JP) ................................. 2007-211730

(51) Int. Cl.
*F16F 15/00* (2006.01)

(52) U.S. Cl.
USPC .................................................... 267/140.14

(58) Field of Classification Search
USPC ............... 267/140.11, 140.13–140.15, 140.3, 267/140.4, 136; 73/570, 576, 579, 584, 586, 73/660; 248/550
See application file for complete search history.

(56) References Cited

U.S. PATENT DOCUMENTS 4,793,599 A * 12/1988 Ishioka ..................... 267/140.14
5,042,786 A * 8/1991 Freudenberg et al. ... 267/140.14
5,275,388 A * 1/1994 Kobayashi et al. ...... 267/140.14

(Continued)

FOREIGN PATENT DOCUMENTS

JP          7-328965 A     12/1995
JP      2000-027931 A      1/2000

(Continued)

*Primary Examiner* — Thomas Irvin
(74) *Attorney, Agent, or Firm* — Carrier Blackman & Associates, P.C.; Joseph P. Carrier; William D. Blackman

(57) ABSTRACT

The natural vibration frequency of a roll resonance which does not occur since the engine rotation number is high in a normal operation range of an engine is detected at the time of engine start or stop when the engine rotation number is lower than the normal operation range, and thus the natural vibration frequency of the roil resonance can be detected with a good accuracy. A current is generated by an electromotive force of an actuator of the active vibration isolation support device excited by the engine immediately before stopping its rotation, and the frequency of the current is used to detect the natural vibration frequency of the engine, and the roll resonance of the engine is suppressed by controlling the operation of the active vibration isolation support device at the time of engine start based on the natural vibration frequency, thereby not only eliminating the need of a specific frequency detection sensor, but also effectively reducing the vibration at the time of engine start when the roll resonance becomes strong.

10 Claims, 12 Drawing Sheets

U.S. PATENT DOCUMENTS

| | | | | |
|---|---|---|---|---|
| 5,332,061 A | * | 7/1994 | Majeed et al. | 180/312 |
| 5,627,440 A | | 5/1997 | Yamamoto et al. | |
| 5,718,417 A | * | 2/1998 | Aoki | 267/140.14 |
| 5,764,409 A | * | 6/1998 | Colvin | 359/382 |
| 5,792,956 A | * | 8/1998 | Li | 73/660 |
| 6,254,069 B1 | * | 7/2001 | Muramatsu et al. | 267/140.14 |
| 6,305,675 B1 | * | 10/2001 | Muramatsu | 267/140.14 |
| 6,325,364 B1 | * | 12/2001 | Muramatsu | 267/140.14 |
| 6,364,294 B1 | * | 4/2002 | Gennesseaux et al. | 267/140.13 |
| 6,672,434 B2 | * | 1/2004 | Schnur et al. | 188/266.7 |
| 7,717,409 B2 | * | 5/2010 | Ishiguro et al. | 267/140.14 |
| 2003/0090645 A1 | * | 5/2003 | Kato | 355/72 |
| 2005/0262943 A1 | * | 12/2005 | Claydon et al. | 73/579 |
| 2009/0224446 A1 | * | 9/2009 | Ishiguro et al. | 267/140.14 |
| 2010/0204881 A1 | * | 8/2010 | Muragishi et al. | 701/36 |

FOREIGN PATENT DOCUMENTS

| | | |
|---|---|---|
| JP | 2000-027933 A | 1/2000 |
| JP | 2000-346703 A | 12/2000 |
| JP | 2005-003156 | 1/2005 |
| JP | 2006-057753 A | 3/2006 |

* cited by examiner

ENGINE NATURAL VIBRATION FREQUENCY DETECTION METHOD, ACTIVE VIBRATION ISOLATION SUPPORT DEVICE CONTROL METHOD, ENGINE NATURAL VIBRATION FREQUENCY DETECTION APPARATUS, ACTIVE VIBRATION ISOLATION SUPPORT DEVICE CONTROL APPARATUS, ACTIVE VIBRATION ISOLATION SUPPORT DEVICE, AND VIBRATION FREQUENCY DETECTION APPARATUS FOR VIBRATING BODY

CROSS REFERENCE TO RELATED APPLICATIONS

The present invention claims priority under 35 USC §119 based on Japanese patent applications Nos. 2007-211729 and 2007-211730 filed 15 Aug. 2007. The subject matters of these priority documents are incorporated by reference herein.

BACKGROUND OF THE INVENTION

1. Field of the Invention

The present invention relates to an engine natural vibration frequency detection method and apparatus for detecting a natural vibration frequency of a rigid body resonance of an engine supported through an active vibration isolation support device toga vehicle body; and an active vibration isolation support device control method and apparatus using the natural vibration frequency detection method.

Further, the present invention relates to an active vibration isolation support device which is disposed between a vibrating body and a supporting body, and is extended and retracted periodically by control means supplying current to an actuator so as to suppress the vibration of the vibrating body from being transmitted to the supporting body; and a vibrating body vibration frequency detection apparatus for detecting the vibration frequency of the vibrating body using the active vibration isolation support device.

2. Description of the Related Art

Japanese Patent Application Laid-open No. 2005-3156 discloses an active vibration isolation support device which calculates a crank angular velocity from a time interval between crank pulses outputted every time a crankshaft rotates through a predetermined angle; calculates a crankshaft torque from a crank angular acceleration obtained by differentiating the crank angular velocity with respect to time; estimates an engine vibrational state as a torque variation; and controls the supply of current to a coil of the actuator according to the engine vibrational state, thus exerting a vibration isolation function.

The engine torque varies according to a crankshaft phase, and thus, as a reaction thereto, a roll moment so as to roll the engine body around the crankshaft also varies according to the crankshaft phase. The cycle in which the roll moment increases and decreases varies according to the engine rotation number. Therefore, when the cycle in which the roll moment increases and decreases matches the roll resonance frequency of an engine elastically mounted on the vehicle body at a specific engine rotation number, a vehicle body vibration occurs, causing a problem giving an unpleasant feeling to the driver or a passenger. Accordingly, the vibration due to a roll resonance needs to be suppressed by detecting the roll resonance frequency and operating the active vibration isolation support device at an engine rotation number range in which the roll resonance occurs.

However, in general, the roll resonance frequency is lower than the vibration frequency in an engine rotation number (an engine rotation number equal to or greater than an idling engine rotation number) in a normal operation range of an engine, and thus there is a problem in that the roll resonance frequency cannot be detected during the normal operation of the engine.

SUMMARY OF THE INVENTION

In view of the above described circumstances, the present invention has been made, and an object of the present invention is to enable an engine rigid body resonance frequency to be detected, and to use the rigid body resonance frequency to control the active vibration isolation support device so as to suppress a vibration due to the engine rigid body resonance. Further, another object of the present invention is to enable a vibration frequency of a vibrating body to be detected using the active vibration isolation support device disposed between the vibrating body and the supporting body.

In order to achieve the object, according to a first feature of the present invention, there is provided an engine natural vibration frequency detection method for detecting a natural vibration frequency of a rigid body resonance of an engine supported through an active vibration isolation support device to a vehicle body, the method comprising a step of detecting the natural vibration frequency when the engine starts or stops.

With the above configuration, the natural vibration frequency of the rigid body resonance which does not occur since the engine rotation number is high in a normal operation range of the engine is detected at the time of engine start or stop when the engine rotation number is lower than the normal operation range, and thus the natural vibration frequency of the rigid body resonance can be detected with a good accuracy.

According to a second feature of the present invention, in addition to the first feature, there is provided the engine natural vibration frequency detection method, wherein the method further comprises steps of generating a current by an electromotive force of an actuator of the active vibration isolation support device which is excited by the engine when the engine starts or stops, and detecting the natural vibration frequency from a frequency of the current.

With the above configuration, a current is generated by electromotive force of the actuator of the active vibration isolation support device excited by the engine at the time of engine start or stop, and the frequency of the current is used to detect the natural vibration frequency of the engine, thereby eliminating the need of a specific frequency detection sensor.

According to a third feature of the present invention, in addition to the second feature, there is provided the engine natural vibration frequency detection method, wherein the method comprises, in a state where a constant current is supplied to the actuator, detecting the natural vibration frequency from a frequency of a vibration waveform of a counter electromotive current superimposed on the constant current.

With the above configuration, the vibration frequency of the vibrating body is detected from the frequency of a vibration waveform of a counter electromotive current of the actuator superimposed on a constant current in a state where the constant current is supplied to the actuator, and thus the vibration waveform of the superimposed current can be prevented from being across the positive current side and the negative current side, thereby enabling the use of current detection means which can detect only one of the current in the positive direction and the current in the negative direction.

According to a fourth feature of the present invention, in addition to any of the first to third features, there is provided an active vibration isolation support device control method for controlling the active vibration isolation support device using the method according to any one of first to third features, wherein the method comprises, when the engine starts or stops, suppressing the rigid body resonance of the engine by controlling the operation of the active vibration isolation support device based on the natural vibration frequency.

With the above configuration, the rigid body resonance of the engine is suppressed by controlling the operation of the active vibration isolation support device based on the natural vibration frequency at the time of engine start or stop, and thus the vibration can be effectively reduced by sufficiently exerting the functions of the active vibration isolation support device at the time of engine start or stop when the vibration is increased by the rigid body resonance of the engine.

According to a fifth feature of the present invention, in addition to the fourth feature, there is provided the active vibration isolation support device control method, wherein the method comprises, based on the natural vibration frequency detected when the engine stops, suppressing the rigid body resonance of the engine by controlling the operation of the active vibration isolation support device when the engine starts.

With the above configuration, the rigid body resonance of the engine is suppressed by controlling the operation of the active vibration isolation support device at the time of engine start based on the natural vibration frequency detected at the time of engine stop. Therefore, at the time of engine start when the rigid body resonance of the engine is stronger than at the time of engine stop, or at the time of engine start when a driver is sensitive to vibration by paying attention to the engine rotational state (whether it has been started or not), the engine vibration can be effectively reduced by the active vibration isolation support device. In addition, the operation of the active vibration isolation support device is controlled based on the most recent natural vibration frequency of the periodically detected natural vibration frequencies, and thus the vibration isolation effect of the active vibration isolation support device can be effectively exerted based on a highly accurate natural vibration frequency.

According to a sixth feature of the present invention, in addition to the fifth feature, there is provided the active vibration isolation support device control method, wherein the method comprises, in a state where a constant current is supplied to the actuator, detecting the natural vibration frequency from the frequency of the vibration waveform of the counter electromotive current superimposed on the constant current.

With the above configuration, the vibration frequency of the vibrating body is detected from the frequency of a vibration waveform of a counter electromotive current of the actuator superimposed on a constant current in a state where the constant current is supplied to the actuator, and thus the vibration waveform of the superimposed current can be prevented from being across the positive current side and the negative current side, thereby enabling the use of current detection means which can detect only one of the current in the positive direction and the current in the negative direction.

According to a seventh feature of the present invention, there is provided an engine natural vibration frequency detection apparatus for detecting a natural vibration frequency of a rigid body resonance of an engine supported through an active vibration isolation support device to a vehicle body, comprising control means for detecting the natural vibration frequency when the engine starts or stops.

With the above configuration, the natural vibration frequency of the rigid body resonance which does not occur since the engine rotation number is high in a normal operation range of the engine is detected at the time of engine start or stop when the engine rotation number is lower than the normal operation range, and thus the natural vibration frequency of the rigid body resonance can be detected with a good accuracy.

According to an eighth feature of the present invention, there is provided an active vibration isolation support device control apparatus for controlling the active vibration isolation support device using the apparatus according to the seventh feature, wherein, when the engine starts or stops, the control means suppresses the rigid body resonance of the engine by controlling the operation of the active vibration isolation support device based on the natural vibration frequency.

With the above configuration, the rigid body resonance of the engine is suppressed by controlling the operation of the active vibration isolation support device based on the natural vibration frequency at the time of engine start or stop, and thus the vibration can be effectively reduced by sufficiently exerting the functions of the active vibration isolation support device at the time of engine start or stop when the vibration is increased by the rigid body resonance of the engine.

According to a ninth feature of the present invention, there is provided an active vibration isolation support device which is disposed between a vibrating body and a supporting body; and extends or retracts periodically by control means supplying a current to an actuator so as to suppress a vibration of the vibrating body from being transmitted to the supporting body, wherein the control means uses current detection means to detect a counter electromotive current of an actuator excited by the vibrating body and detect a vibration frequency of the vibrating body from a frequency of a vibration waveform of the counter electromotive current.

With the above configuration, when the active vibration isolation support device which extends and retracts periodically by a supply of current to the actuator so as to suppress the vibration of the vibrating body from being transmitted to the supporting body is excited with a vibration from the vibrating body, the vibration waveform of a counter electromotive current of the actuator is detected by the current detection means, and thus the vibration frequency of the vibrating body can be detected from the frequency of the vibration waveform of the counter electromotive current. Thereby, the vibration frequency of the vibrating body can be detected with a good accuracy without needing a specific acceleration sensor.

According to a tenth feature of the present invention, there is provided a vibrating body vibration frequency detection method for detecting a vibration frequency of a vibrating body using an active vibration isolation support device which is disposed between the vibrating body and a supporting body; and extends or retracts periodically by supplying a current to an actuator so as to suppress a vibration of the vibrating body from being transmitted to the supporting body, wherein the method comprises steps of detecting, by current detection means, a counter electromotive current of the actuator of the active vibration isolation support device excited by the vibrating body and detecting the vibration frequency of the vibrating body from a frequency of a vibration waveform of the counter electromotive current.

With the above configuration, the vibration frequency of the vibrating body is detected from the frequency of a vibration waveform of a counter electromotive current of the actuator superimposed on a constant current in a state where the constant current is supplied to the actuator, and thus the vibration waveform of the superimposed current can be prevented from being across the positive current side and the negative current side, thereby enabling the use of current detection means which can detect only one of the current in the positive direction and the current in the negative direction.

The above-mentioned object, other objects, characteristics, and advantages of the present invention will become apparent from an explanation of preferred embodiments, which will be described in detail below by reference to the attached drawings.

BRIEF DESCRIPTION OF THE DRAWINGS

FIG. 1 is a longitudinal sectional view of the active vibration isolation support device.

FIG. 2 is an enlarged view of the unit 2 in FIG. 1.

FIG. 3 is a drawing illustrating an engine support configuration by the active vibration isolation support device.

FIG. 4 is a flowchart showing an actuator control method at normal operation.

FIG. 5 is an explanatory drawing for the step S5 in the flowchart of FIG. 4.

FIG. 6 is a flowchart showing an operation at the time of engine stop.

FIG. 7 is a flowchart showing an operation at the time of engine start.

FIG. 8 is a drawing illustrating an engine roll vibration waveform.

FIG. 9 is a drawing illustrating a roll vibration waveform and a current waveform at the time of engine stop.

FIGS. 10 to 12C illustrate a second embodiment of the present invention.

FIG. 10 is a block diagram of the vibration frequency detection unit

FIG. 11 is a flowchart showing a vibration frequency detection method.

FIGS. 12A to 12C are drawings illustrating a waveform of a current detected by the current detection circuit.

DESCRIPTION OF THE PREFERRED EMBODIMENTS

First, with reference to FIGS. 1 to 9, the first embodiment of the present invention will be described.

Figure 1:
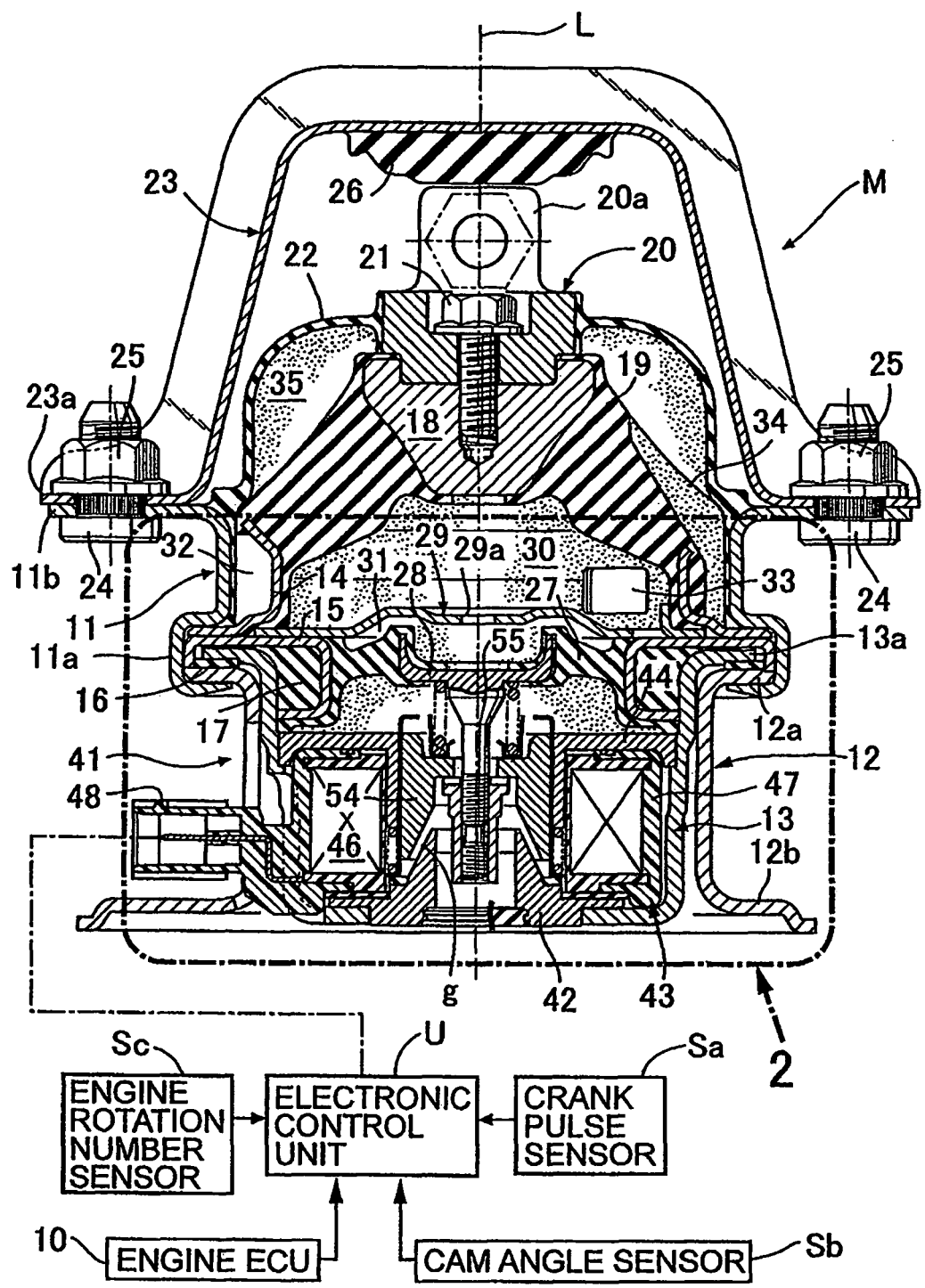
FIGS. 1 to 9 illustrate a first embodiment of the present invention.
Figure 2:
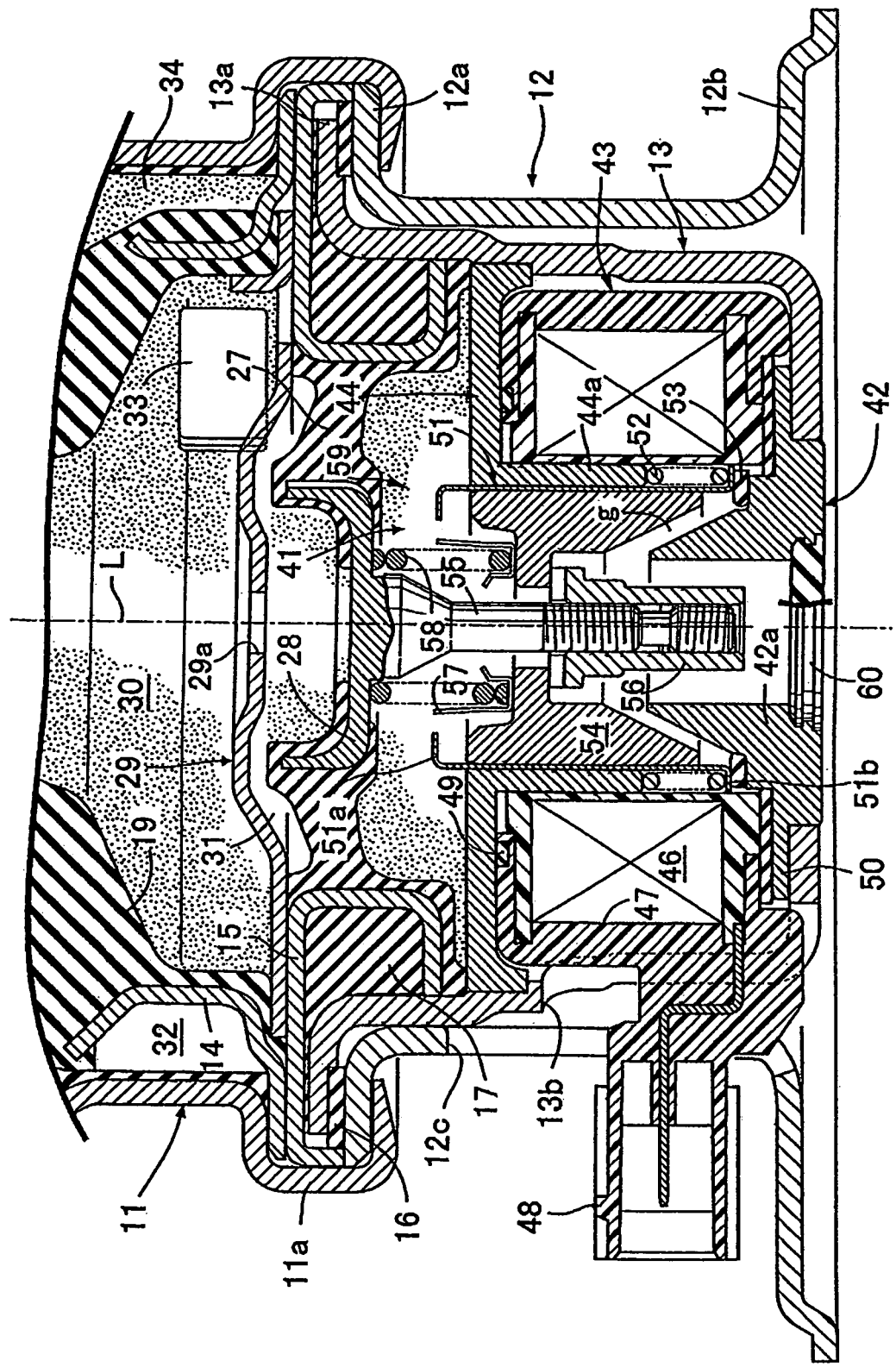

As shown in FIGS. 1 and 2, an active vibration isolation support device M (active control mount) used to elastically support an automobile engine on a vehicle frame has a substantially axisymmetric structure with respect to an axis, in which a flange portion 13*a* on an outer periphery of a substantially cup-shaped actuator case 13 opened upwardly, an outer peripheral portion of a first annular elastic body support ring 14, and an outer peripheral portion of a second annular elastic body support ring 15 are superimposed and joined by crimping between a flange portion 11*a* on a lower end of a substantially cylindrical upper housing 11 and a flange portion 12*a* on an upper end of a substantially cylindrical lower housing 12. In this process, a first annular floating rubber 16 is interposed between the flange portion 12*a* of the lower housing 12 and the flange portion 13*a* of the actuator case 13; and a second annular floating rubber 17 is interposed between an upper portion of the actuator case 13 and an inner surface of the second annular elastic body support ring 15, so that the actuator case 13 is floatingly supported so as to be relatively movable with respect to the upper housing 11 and the lower housing 12.

The lower end and the upper end of a first elastic body 19 made of thick rubber are joined by vulcanization bonding to the first annular elastic body support ring 14 and a first elastic body support boss 18 disposed on the axis L respectively. A diaphragm support boss 20 is fixed to an upper surface of the first elastic body support boss 18 by a bolt 21. The outer peripheral portion of a diaphragm 22 whose inner peripheral portion is joined by vulcanization bonding to the diaphragm support boss 20 is joined by vulcanization bonding to the upper housing 11. An engine mounting portion 20*a* integrally formed on an upper surface of the diaphragm support boss 20 is fixed to the engine (not shown). A vehicle body mounting portion 12*b* on the lower end of the lower housing 12 is fixed to the vehicle body frame (not shown).

A flange portion 23*a* on the lower end of a stopper member 23 is joined by bolts 24 and nuts 25 to a flange portion 11*b* on the upper end of the upper housing 11. The engine mounting portion 20*a* projectingly provided on the upper surface of the diaphragm support boss 20 faces abutably against a stopper rubber 26 attached to an upper inner surface of a stopper member 23. When a large load is inputted to the active vibration isolation support device M, the engine mounting portion 20*a* abuts against the stopper rubber 26, thereby suppressing excessive displacement of the engine.

The outer peripheral portion of the second elastic body 27 made of membranous rubber is joined by vulcanization bonding to the second elastic body support ring 15. A movable member 28 is joined by vulcanization bonding to a central portion of the second elastic body 27 so as to be embedded therein. The outer peripheral portion of the second elastic body 27 is sandwiched between the second elastic body support ring 15 and a yoke 44 described later, and the annular thick portion at the front edge thereof exerts a seal function. A disc-shaped partition wall member 29 is fixed between an upper surface of the second elastic body support ring 15 and the outer peripheral portion of the first elastic body 19. A first liquid chamber 30 defined by the partition wall member 29 and the first elastic body 19, and a second liquid chamber 31 defined by the partition wall member 29 and the second elastic body 27, communicate with each other via a through hole 29a formed in the middle of the partition wall member 29.

An annular through passage 32 is formed between the first elastic body support ring 14 and the upper housing 11. One end of the through passage 32 communicates with the first liquid chamber 30 via a through hole 33, and the other end of the through passage 32 communicates via a through hole 34 with a third liquid chamber 35 defined by the first elastic body 19 and the diaphragm 22.

Next, the structure of an actuator 4i for driving the movable member 28 will be described.

A fixed core 42, a coil assembly 43, and a yoke 44 are mounted within the actuator case 13 from bottom to top respectively. The coil assembly 43 includes a coil 46 disposed between the fixed core 42 and the yoke 44, and a coil cover 47 covering the outer periphery of the coil 46. The coil cover 47 is formed integrally with a connector 48 running through openings 13*b* and 12*c* formed in the actuator case 13 and the lower housing 12 and extending outward.

A seal member 49 is disposed between an upper surface of the coil cover 47 and a lower surface of the yoke 44. A seal member 50 is disposed between a lower surface of the coil 46 and an upper surface of the fixed core 42. These seal members 49 and 50 can prevent water or dust from entering an internal space of the actuator 41 through the openings 13*b* and 12*c* formed in the actuator case 13 and the lower housing 12.

A thin cylindrical bearing member 51 is fitted, in a vertically slidable manner, into an inner peripheral surface of a cylindrical portion 44a of the yoke 44. An upper flange 51a being bent radially inward is formed at the upper end of the bearing member 51, and a lower flange 51b being bent radially outward is formed at the lower end thereof. A set spring 52 is disposed in a compressed state between the lower flange 51b and the lower end of the cylindrical portion 44a of the yoke 44. The elastic force of the set spring 52 presses the lower flange 51b against the upper surface of the fixed core 42 via an elastic body 53, so that the bearing member 51 is supported by the yoke 44.

A substantially cylindrical movable core 54 is fitted, in a vertically slidable manner, into an inner peripheral surface of the bearing member 51. A rod 55 extending downward from the center of the movable member 28 runs loosely through the center of the movable core 54, and the lower end of the rod 55 is tightened into a nut 56. A set spring 58 is disposed in a compressed state between a spring seat 57 provided on an upper surface of the movable core 54 and a lower surface of the movable member 28. The elastic force of the set spring 58 presses the movable core 54 against the nut 56 so as to be fixed. In this state, the lower surface of the movable core 54 and the upper surface of the fixed core 42 face each other across a conical air gap g. Within an opening 42a formed in the center of the fixed core 42, the vertical position of the nut 56 is adjusted and tightened with respect to the rod 55 and this opening 42a is blocked by a rubber cap 60.

The active vibration isolation support device M configured as above is controlled by an electronic control unit U according to the vibrational state of the engine.

The electronic control unit U is connected to a crank pulse sensor Sa for detecting a crank pulse outputted 24 times per rotation of the crankshaft, namely, a crank pulse outputted once at each 15° of the crank angle with the rotation of the crankshaft of the engine; and is connected to a cam angle sensor Sb for detecting a pulse outputted three times per rotation of the crankshaft, namely, a pulse outputted once at each top dead center of each cylinder. The electronic control unit U estimates the vibrational state of the engine based on the outputs of the crank pulse sensor Sa and the cam angle sensor Sb and controls supplying current to the actuator 41 of the active vibration isolation support device M.

The coil 46 of the actuator 41 is magnetized by a control of supplying a current from the electronic control unit U to absorb the movable core 54 to move the movable member 28 downward. With the movement of the movable member 28, the second elastic body 27 defining the second liquid chamber 31 is deformed downward, thereby increasing the capacity of the second liquid chamber 31. On the contrary, when the coil 46 is demagnetized, the second elastic body 27 is deformed upward by its own elasticity. Then, the movable member 28 and the movable core 54 move upward and the capacity of the second liquid chamber 31 is reduced.

When a low frequency engine shake vibration occurs while the automobile is moving, the first elastic body 19 is deformed by a load inputted from the engine and the capacity of the first liquid chamber 30 is changed. Then, a liquid moves to and from the first liquid chamber 30 and the third liquid chamber 35 connected via the through passage 32. As the capacity of the first liquid chamber 30 increases or decreases, the capacity of the third liquid chamber 35 decreases or increases correspondingly, and this change in the capacity of the third liquid chamber 35 is absorbed by elastic deformation of the diaphragm 22. Since the shape and the dimensions of the through passage 32 and the spring constant of the first elastic body 19 are set so as to indicate a low spring constant and high damping force in the frequency region of the engine shake vibration, the vibration transmitted from the engine to the vehicle body frame can be effectively reduced.

It should be noted that the actuator 41 is maintained in a non-operating state in the frequency region of the engine shake vibration.

When a vibration having a higher frequency than that of the engine shake vibration, namely, a vibration during idling due to a rotation of the engine crankshaft or a vibration during the partial cylinder deactivation operation in which a part of the cylinders of the engine are deactivated occurs, the liquid within the through passage 32 connecting the first liquid chamber 30 and the third liquid chamber 35 is in a stick state and a vibration isolation function cannot be exhibited. Therefore, the actuator 41 is driven to exert a vibration isolation function.

In order to operate the actuator 41 of the active vibration isolation support device M to exert the vibration isolation function, the electronic control unit U controls supplying a current to the coil 46 based on the signals from the crank pulse sensor Sa, the cam angle sensor Sb, the engine rotation number sensor Sc, and the engine ECU 10.

Figure 3:
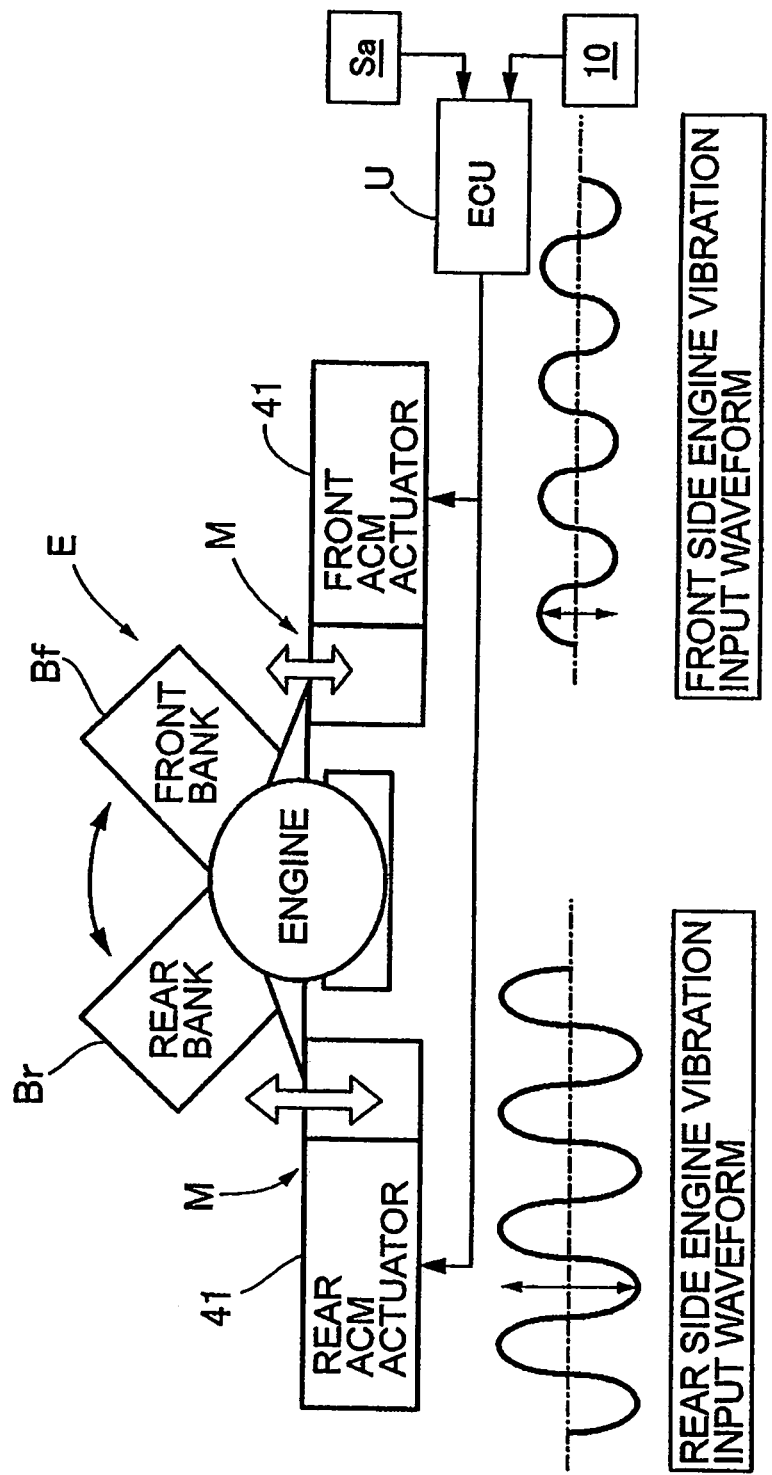

As shown in FIG. 3, a V-type engine E includes a front bank Bf and a rear bank Br, and the rear side and the front side thereof are supported by the active vibration isolation support devices M and M respectively. In order to operate the actuators 41 and 41 of the active vibration isolation support devices M and M at the rear side and the front side to exhibit the vibration isolation function, the electronic control unit U controls supplying a current to the actuators 41 and 41 based on the signals from the crank pulse sensor Sa and the engine control ECU 10.

Next, the control of the active vibration isolation support device M configured as above will be described. The front bank Bf side and the rear bank Br side of the engine E are supported by the active vibration isolation support devices M and M respectively; and the active vibration isolation support devices M and M are controlled independently.

Figure 4:
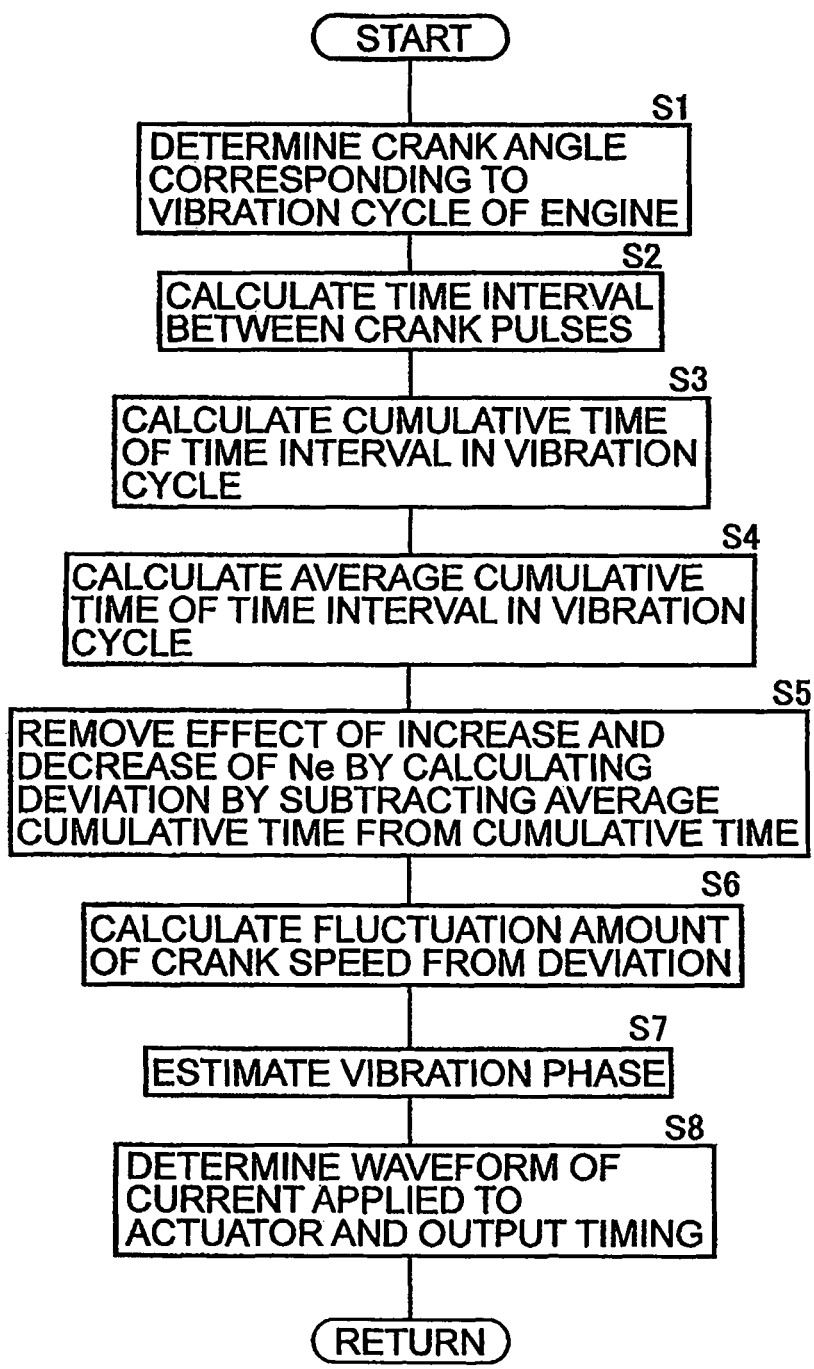

First, with reference to the flowchart of FIG. 4, the control of the engine E in a normal operation state except the engine start state will be described.

Preliminarily, a determination is made to see whether the engine is in a partial cylinder deactivation operation state in which a part of the cylinders of the engine are deactivated or an all cylinder operation state in which all the cylinders of the engine are operating, based on the information from the engine ECU 10. In the present embodiment, description is given to a 4-cycle, V-type, 6-cylinder engine. During the all cylinder operation, combustion occurs six times while the crankshaft rotates twice, and thus the crank angle of the vibration cycle is 120°. In the vibration cycle, eight crank pulses are outputted per 15° of crank angle. During the cylinder deactivation operation in which the cylinders of one bank are deactivated, combustion occurs three times while the crankshaft rotates twice, and thus the crank angle of the vibration cycle is 240°, during which 16 crank pulses are outputted.

Figure 5:
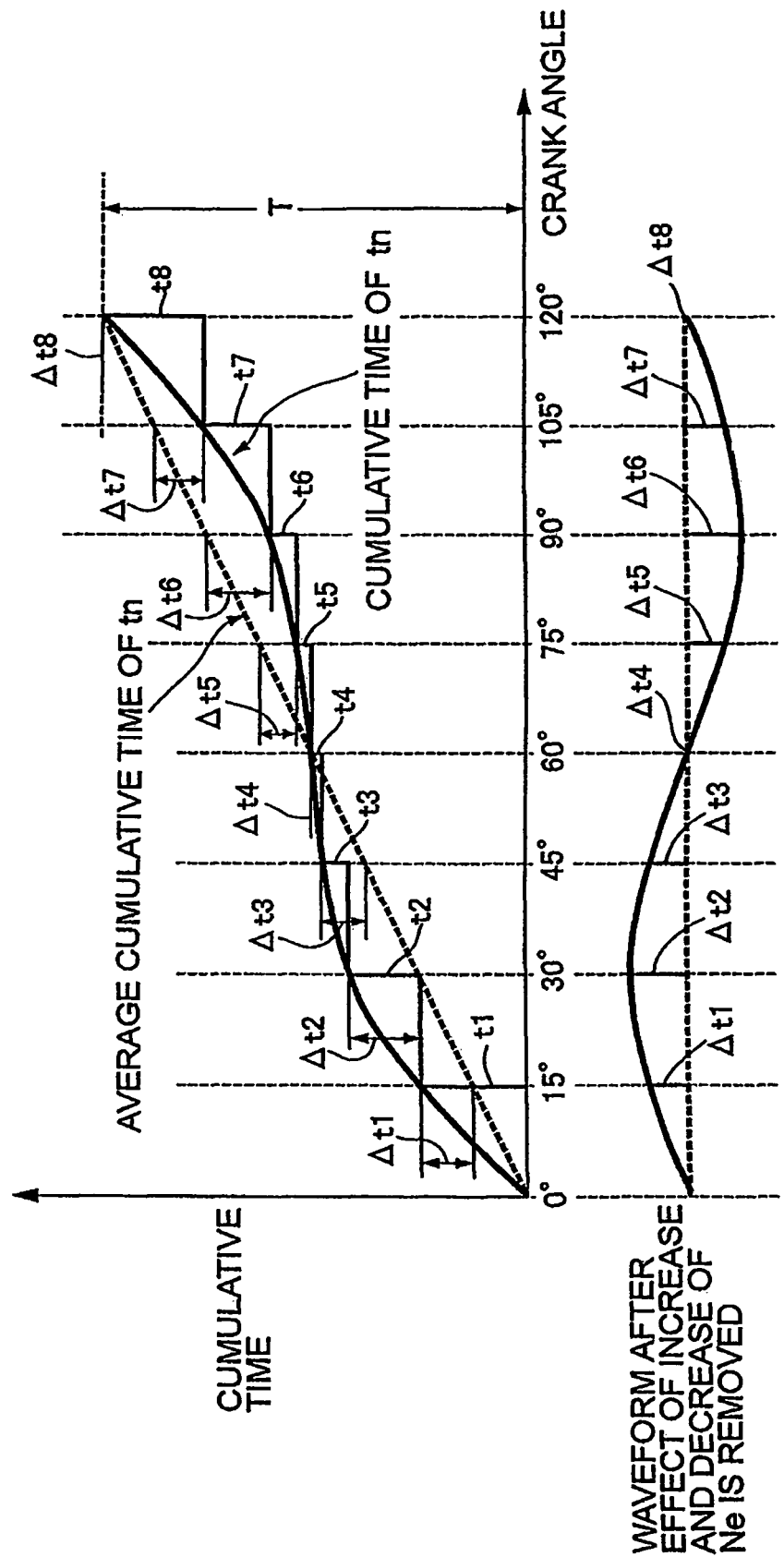

For example, if the engine is determined to be in the all cylinder operation state, first, in step S1, the crank angle with respect to the engine vibration cycle T is determined (120° in this case). Subsequently, in step S2, eight crank pulses in the vibration cycle T are read to calculate the time interval between the crank pulses. As shown in FIG. 5, eight crank pulses are outputted in the vibration cycle T, and the time intervals tn (t1, t2, t3, . . . , t8) vary according to the change in angular velocity of the crankshaft.

In other words, in the engine combustion stroke, the crank angular velocity ω is increased and the time interval tn becomes shorter, while in the engine compression stroke, the crank angular velocity ω is decreased and the time interval tn becomes longer, otherwise, in a stroke where engine rotation number Ne is increased, the time interval tn becomes shorter with an increase in crank angular velocity ω, and in a stroke where engine rotation number Ne is decreased, the time interval tn becomes longer with an decrease in crank angular velocity ω. Accordingly, as shown in FIG. 5, the time interval tn of the crank pulse includes an element attributable to a change in crank angular velocity ω with a vibration within each vibration cycle T of the engine, and an element attributable to a change in crank angular velocity ω with an increase or decrease in engine rotation number Ne.

Of the above described two elements, what affects the control of the active vibration isolation support device M is the former element (a change in crank angular velocity ω with a vibration), and thus the latter element (a change in crank angular velocity ω with an increase or decrease in engine rotation number Ne) which does not affect the control of the active vibration isolation support device M, needs to be eliminated.

Subsequently, in step S3, a cumulative time of eight time intervals tn between the crank pulses is calculated as $\Sigma tn = t1 + t2 + t3 + \ldots + t8$. This cumulative time $\Sigma tn$ corresponds to the vibration cycle T.

Subsequently, in step S4, an average cumulative time of eight time intervals tn is calculated. As it is apparent from FIG. 5, the line for the cumulative time is an S-shaped curve; while the line for the average cumulative time is a straight line connecting between the starting point of the line for the cumulative time and the ending point thereof. In other words, the average cumulative time corresponds to a cumulative time when the angular velocity ω is constant, and the value is increased by T/8 each time the crank angle is increased 15°.

Subsequently, in step S5, at each position every 15° of crank angle, the average cumulative time is subtracted from the cumulative time to calculate the eight deviations $\Delta t1$, $\Delta t2$, $\Delta t3$, ..., $\Delta t8$. The S-shaped curved line shown at bottom in FIG. 5 indicates deviation $\Delta tn$, and the line corresponds to a variation waveform of time interval tn between the crank pulses without effects of a change in engine rotation number Ne, namely corresponds to a deviation of the crank pulse with respect to the time interval tn when the angular velocity ω is constant.

Assuming that there is no engine vibration, if the engine rotation number Ne is constant, the cumulative time of time intervals tn is increased lineally in the same manner as for the average cumulative time; but if the engine rotation number Ne is increased or decreased, the cumulative time of time intervals tn is out of the line for the average cumulative time. However, the present embodiment uses, as the base, the linear average cumulative time obtained by averaging the engine rotation number Ne which varies actually, and calculates deviation $\Delta tn$ from the average cumulative time to obtain deviation $\Delta tn$ attributable to only the engine vibration by eliminating the effects of a change in engine rotation number Ne. This calculation corresponds to obtaining a deviation of a real angular velocity with respect to an average angular velocity of crankshaft.

Subsequently, in step S6, a maximum value and a minimum value of deviation $\Delta tn$ are determined; the fluctuation amount VAPP of crank speed is calculated based on the deviation between the maximum value and the minimum value thereof. In step S7, the vibration phase is estimated based on the output timing of the cam angle sensor Sb and the time n to reach the minimum value. In step S8, the vibration amplitude is calculated based on the map between the fluctuation amount VAPP and the engine rotation number stored preliminarily in the electronic control unit U to determine the waveform of a current applied to the actuator 41; and to determine the timing of outputting the waveform of a current applied to the actuator 41 based on the map between the phase and the engine rotation number.

It should be noted that if the engine is determined to be in the cylinder deactivation operation state, 16 crank pulses in the vibration cycle T are read to determine the waveform of a current applied to the actuator 41 and the output timing thereof in the same procedure as in the all cylinder operation state.

As described above, when the engine vibrates, the active vibration isolation support device M extends or retracts so as to follow the vertical movement of the engine according to the amplitude and the phase of the vibration, so that the vibration of the engine can be suppressed from being transmitted to the vehicle body frame to exert the vibration isolation function.

The engine E converts a force of pushing a piston down by an explosion of an air-fuel mixture in a combustion chamber to a rotary movement of the crankshaft through a connecting rod, and a roll moment around the crankshaft acts on the engine body as a reaction to the rotation of the crankshaft. The frequency in which the roll moment varies is changed according to the engine rotation number. Therefore, when the frequency in which the roll moment varies matches a roll resonance frequency of the engine E in a specific engine rotation number, a vehicle body vibration occurs, giving an unpleasant feeling to the driver or a passenger.

In general, the roll resonance frequency is lower than the vibration frequency in an engine rotation number (an engine rotation number equal to or greater than an idling engine rotation number) in a normal operation range of the engine E, and thus a roll resonance of the engine E occurs when the engine rotation number reaches a predetermined engine rotation number less than the idling engine rotation number at the start and stop of the engine E.

With that in mind, the present embodiment detects the roll resonance frequency of the engine E and operates the active vibration isolation support device M in an engine rotation number range corresponding to the roll resonance frequency to suppress a vehicle body vibration attributable to the roll resonance of the engine E.

Hereinafter, the operation will be described with reference to FIGS. 6 to 9.

Figure 6:
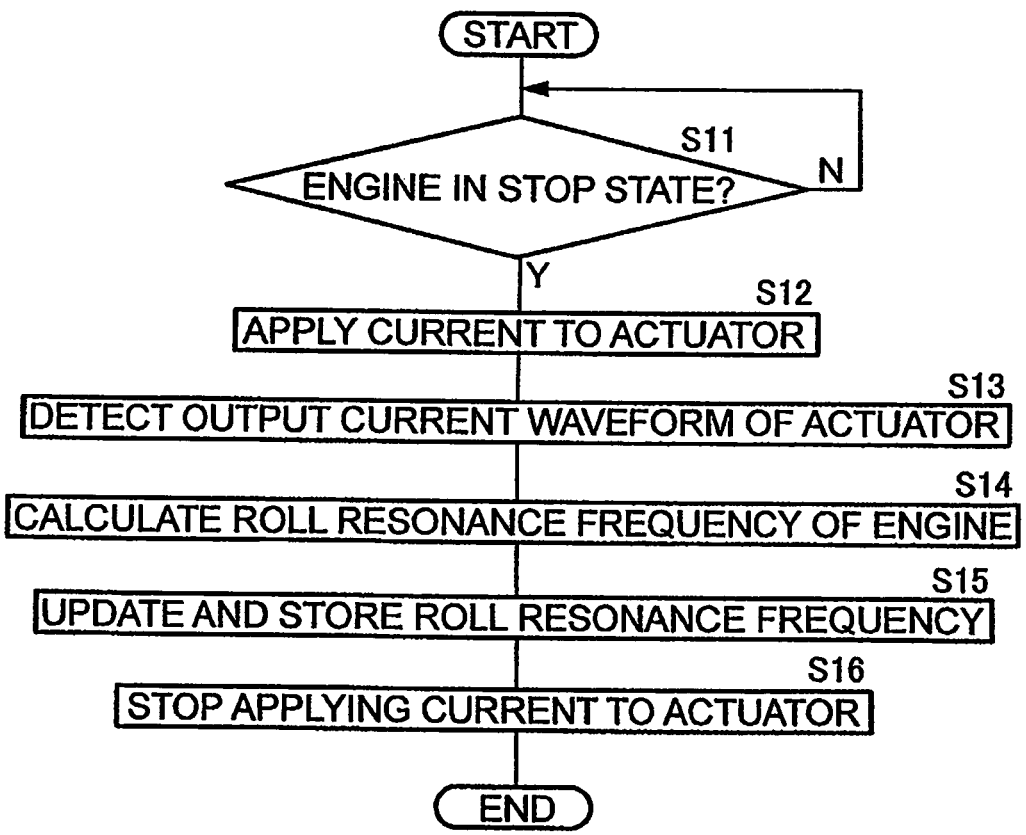

First, in step S11 of the flowchart in FIG. 6 showing the control when the engine E stops, a determination is made to see whether the engine E stops. Here, the stop of the engine E does not mean the state in which the crankshaft stops rotating, but the state in which no action (combustion) of an individual cylinder occurs. The state is determined when the voltage of the engine ECU 10 is changed from 5 V at normal operation to 0 V.

Subsequently, in step S12, a DC constant current (e.g., 1 A) is applied to the actuator 41 of the active vibration isolation support device M. In the previous step S11, even if the engine E stops, the crankshaft continues rotating by inertia, and thus the engine E vibrates a while, the active vibration isolation support device M extends or retracts, and the actuator 41 thereof is driven by an external force. As a result, an electromotive force occurs in the coil 34 of the actuator 41 and in step S13, an ammeter detects the DC current of a frequency according to the vibration frequency of the engine E.

Subsequently, in step S14, a region in which the amplitude of the current becomes equal to or greater than a predetermined value, namely, a roll resonance region, is extracted, and the roll resonance frequency is calculated from the frequency of the current in the roll resonance region. Subsequently, in step S15, the roll resonance frequency is updated for each loop and is stored in memory, and in step S16, applying an DC constant current of 1 A to the actuator 41 is stopped.

The reason for applying an DC constant current of 1 A to the actuator 41 in the previous step S12 is that the current sensor is configured to detect an AC current generated by an electromotive force of the coil 34 of the actuator 41 operated by supplying a current only in one direction and not to detect a negative current. The use of a current sensor capable of detecting a current both in a positive and negative direction may eliminate the need of applying a DC constant current.

Figure 7:
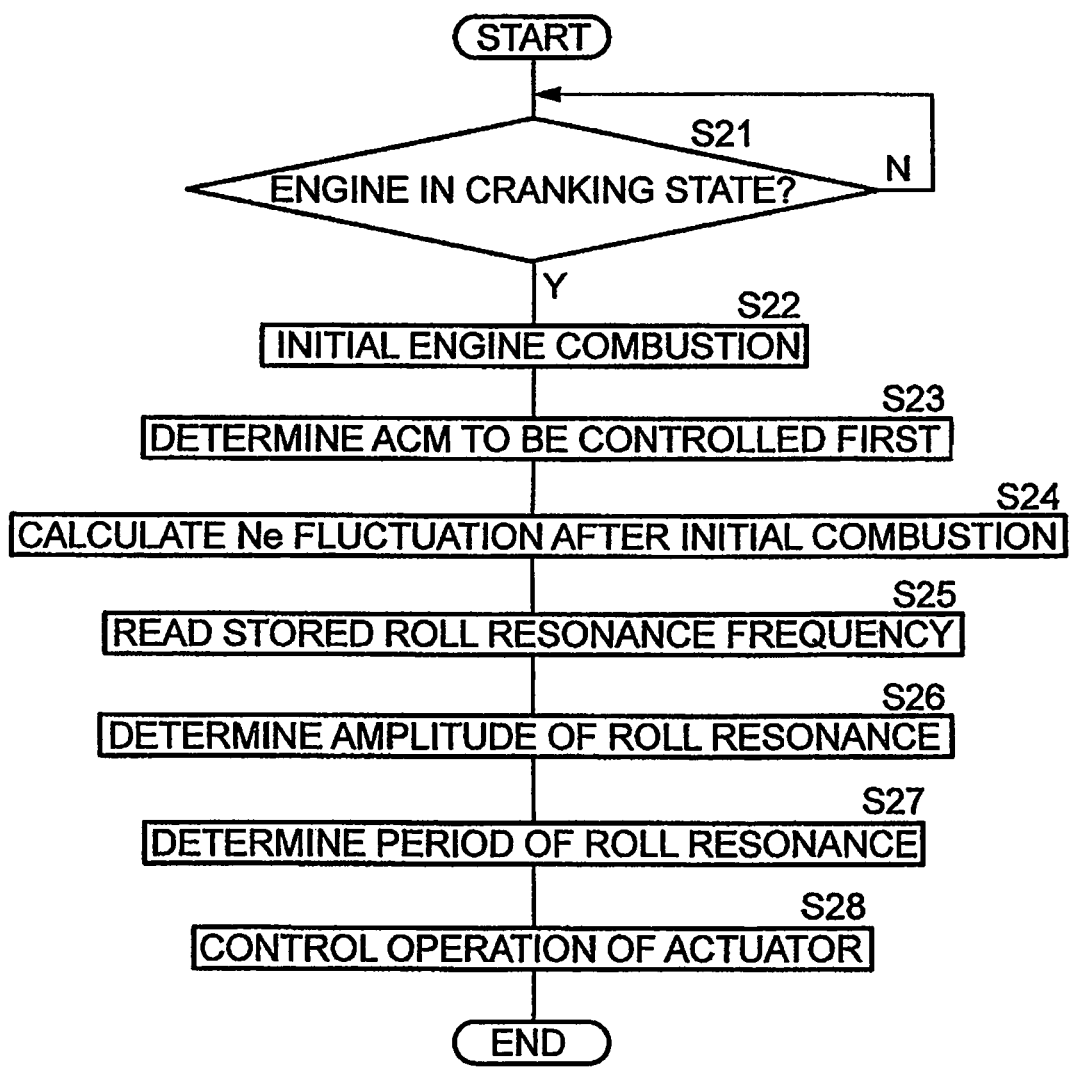

Next, in step S21 of the flowchart in FIG. 7 showing the control when the engine E starts, a determination is made to see whether the engine E is in a cranking state for starting or not. It can be known from a crank pulse signal outputted by the crank pulse sensor Sa that the engine E is in a cranking state. Subsequently, in step S22, an initial combustion of the engine E is determined. The initial combustion of the engine E can be known from a sharp reduction of the time interval between the crank pulse signals, namely, a sharp increase of the crank angular velocity.

Subsequently, in step S23, a determination is made to start controlling from which one of the active vibration isolation support devices M and M at the front side and at the rear side. The reason is that the initial rolling direction of the engine E is determined according to the situation in which the initial combustion occurs in which one of the two banks Bf and Br. Subsequently, in step S24, the fluctuation of the engine rotation number is calculated in the same procedure as in the previous flowchart of FIG. 4. In step S25, the stored roll resonance frequency is read. Subsequently, in step S26, the amplitude of the roll resonance is determined from the fluctuation of the engine rotation number by map search. In step S27, the duration time of the roll resonance is determined from the fluctuation of the engine rotation number by map search. In step S28, the operation of the actuator 41 is controlled based on the roll resonance frequency, the amplitude of the roll resonance, and the duration time of the roll resonance, so that the vibration when the engine E starts can be suppressed.

Figure 8:
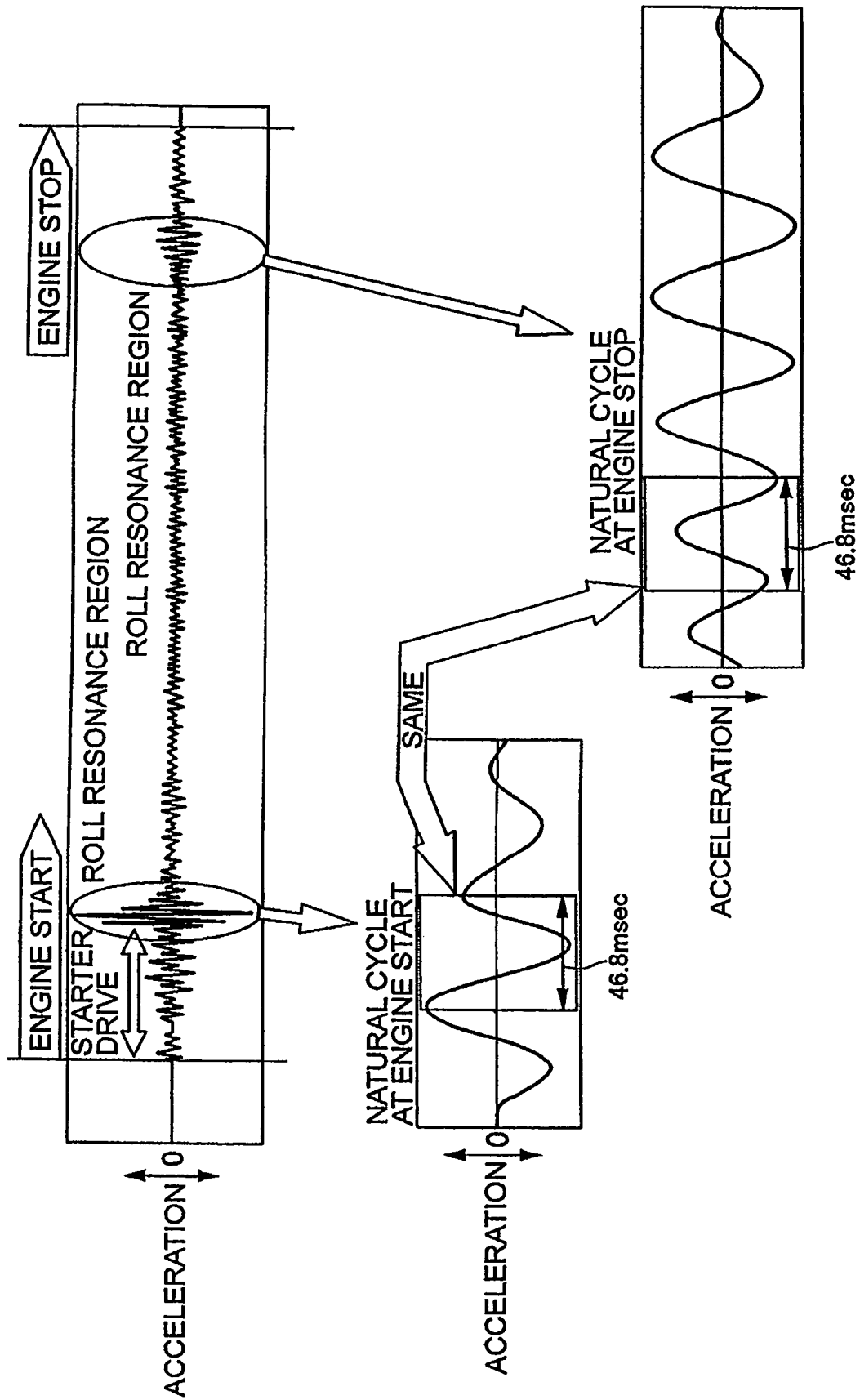

As it is apparent from FIG. 8, the roll resonance of the engine E occurs when the engine E starts and stops; the cycle (frequency) of the roll resonance is the same when the engine E starts and stops, but the amplitude at the time of start is greatly larger than the one at the time of stop. Therefore, the frequency of the roll resonance is detected at the time of stop and the frequency is used to control the active vibration isolation support device M in order to suppress the vibration due to the roll resonance at the time of next start Even if the roll resonance frequency varies due to mount deterioration, change in engine weight and the like, the vibration due to the roll resonance can be effectively suppressed as a whole. In addition, the vibration isolation effect of the active vibration isolation support device M can be effectively exerted by controlling the operation of the active vibration isolation support device M based on the most recent natural vibration frequency of the periodically detected natural vibration frequencies.

In addition, when the engine E starts, the driver is sensitive to the vibration because the driver pays attention to the engine rotational state (whether to start or not). At this time, the active vibration isolation support device M is operated to suppress the vibration due to the roll resonance, so that the driver can feel an increased vibration suppression effect on the body.

Figure 9:
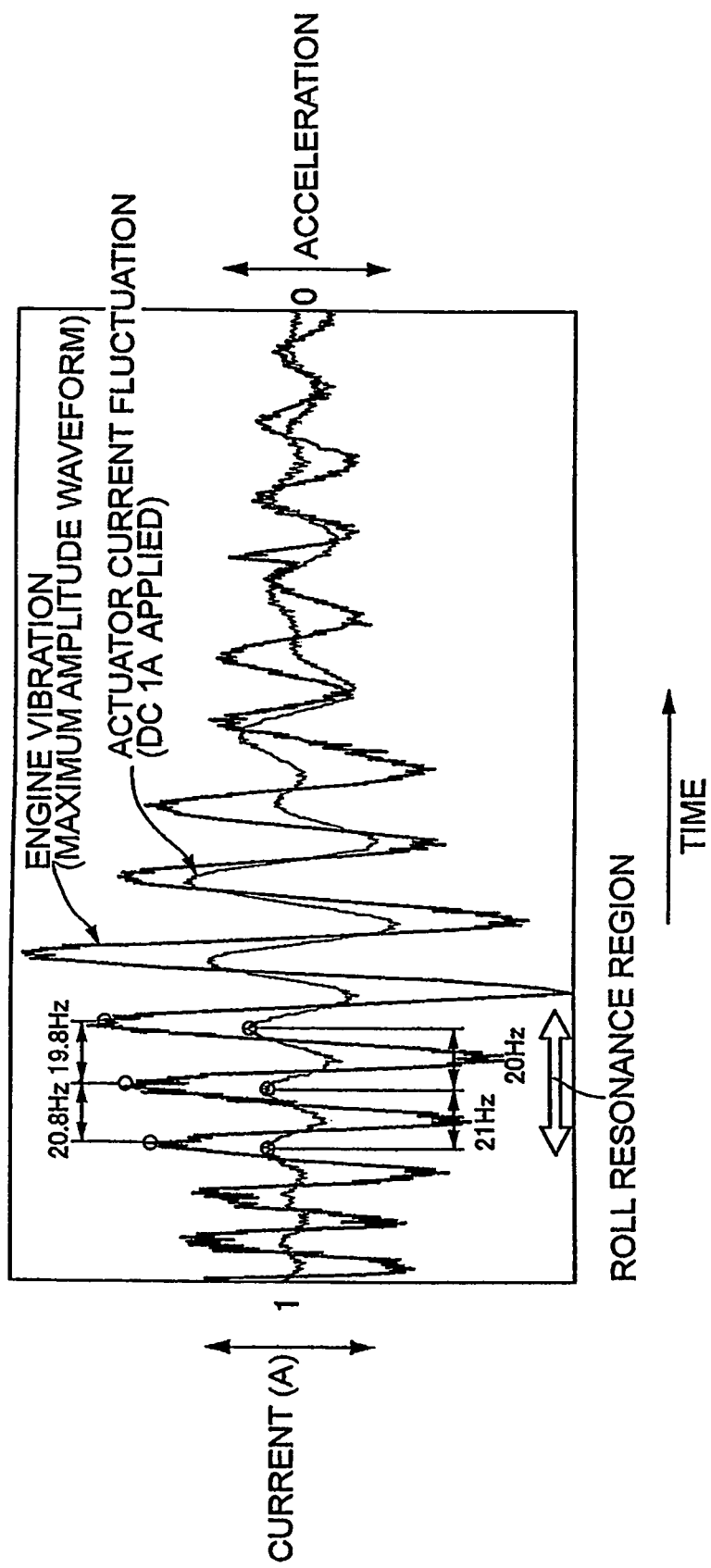
Figure 10:
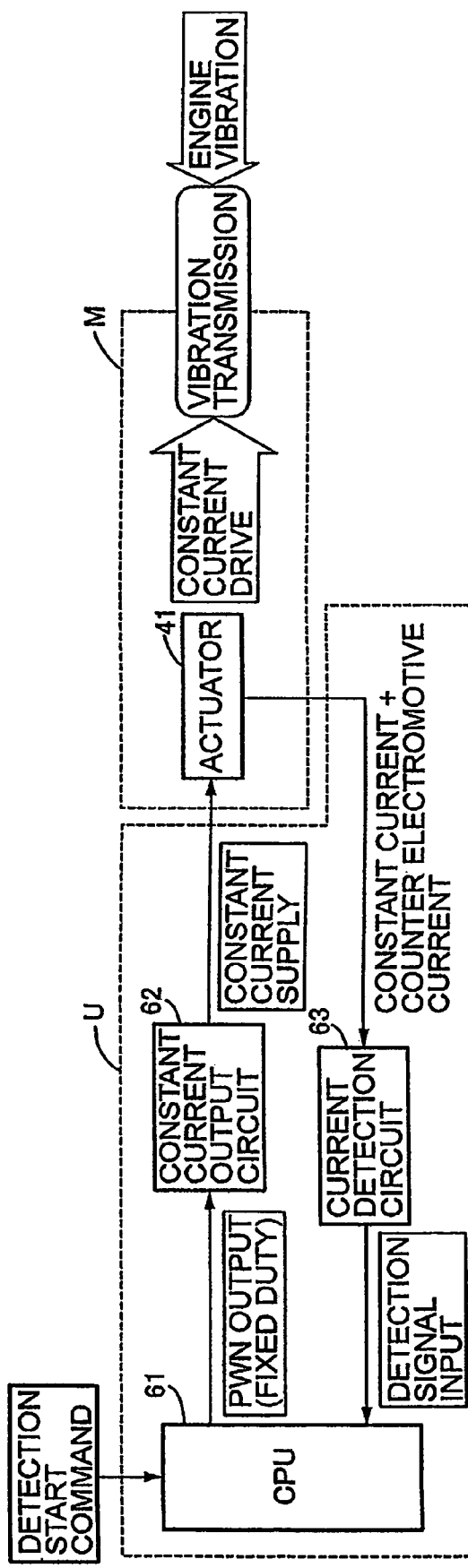
Figure 11:
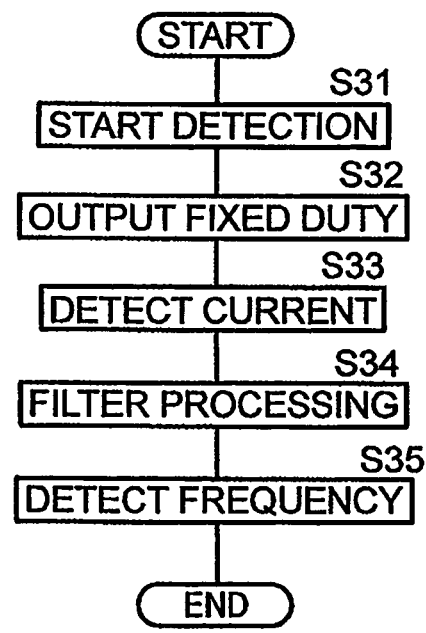

FIG. 9 illustrates a real roll vibration waveform and a current waveform due to an electromotive force of the actuator 41 when the engine E stops. As it is apparent from this figure, the frequencies of the three waveforms immediately before the waveform having maximum amplitude of the real roll vibration almost match the frequencies of the corresponding current waveforms.

Next, the second embodiment of the present invention will be described with reference to FIGS. 10 to 12C.

The electronic control unit U of the active vibration isolation support device M includes a CPU 61, a constant current output circuit 62, and a current detection circuit 63. In step S31 of the flowchart in FIG. 11, when the engine E stops, a stop signal of the engine E is inputted from the engine ECU 10. Then, in step S32, the CPU 61 outputs a PWM command of fixed duty to the constant current output circuit 62. Then, a DC current (e.g., 1 A) is supplied to the actuator 41 of the active vibration isolation support device M (see FIG. 12A). Here, it is due to the effect of chopping by PWM that the DC constant current fluctuates finely.

Meanwhile, the engine E enters the stop operation according to the control signal of the engine ECU 10, and gradually reduces the number of rotations. In the process of reducing the number of rotations of the engine E, a vibration is inputted from the engine E to the actuator 41 of the active vibration isolation support device M. The vibration changes the load applied to the first elastic body 19, which is deformed, causing the capacity of the first liquid chamber 30 to change accordingly. With the change in the capacity of the first liquid chamber 30, the movable core 54 connected to the movable member 28 reciprocates relative to the coil 46, in which an AC counter electromotive current having a waveform corresponding to the vibration waveform of the engine E occurs in the coil 46. The AC current due to the counter electromotive current is superimposed on the constant current. The reason for applying an DC constant current of 1 A to the actuator 41 in the previous step S32 is that the current detection circuit 63 is configured to detect an AC current generated by an electromotive force of the coil 46 of the actuator 41 operated by supplying a current only in one direction and not to detect a negative current. The use of the current detection circuit 63 capable of detecting a current both in a positive and negative direction may eliminate the need of applying a constant current.

Figure 12A:
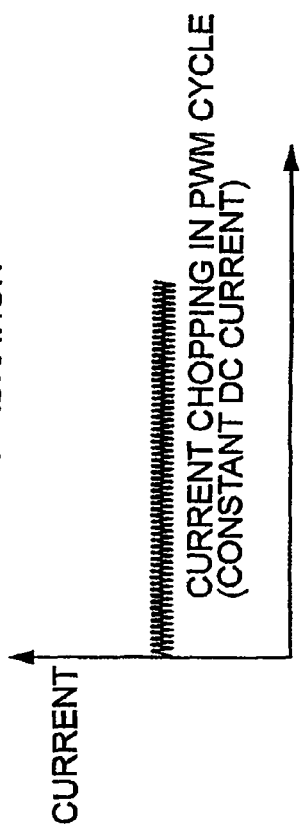
Figure 12B:
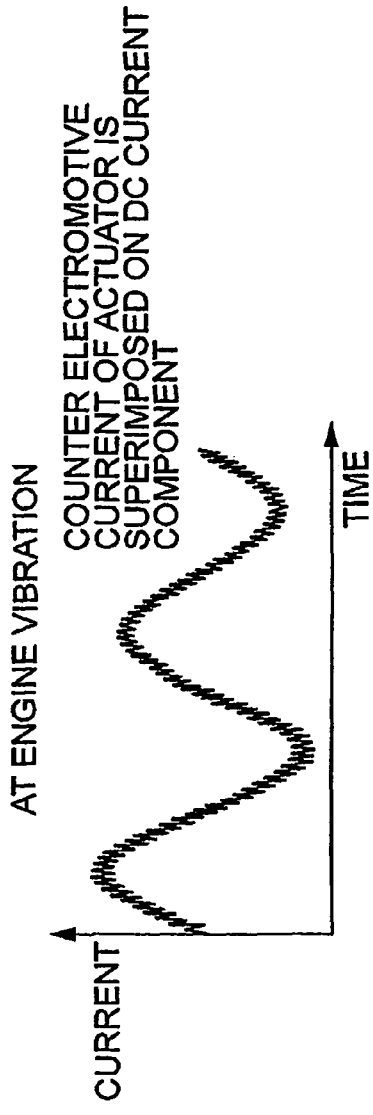
Figure 12C:
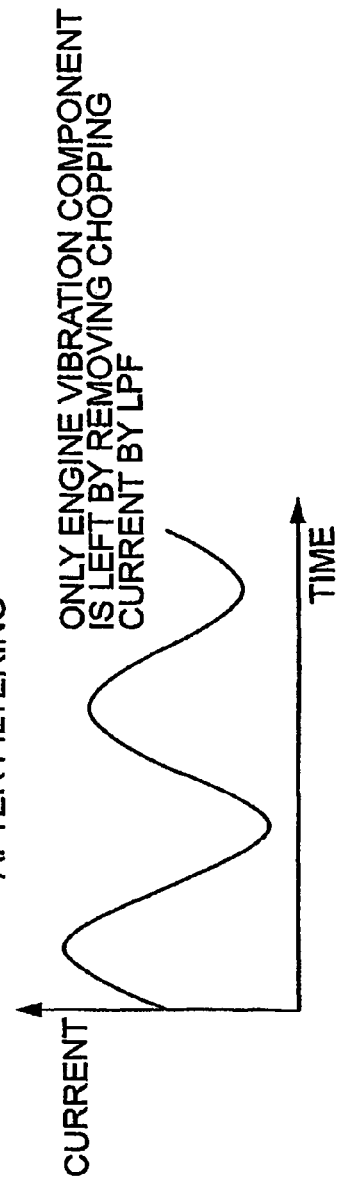

In step S33, the superimposed current is detected by the current detection circuit 63 (see FIG. 12B). In step S34, the current detected by the current detection circuit 63 undergoes a filtering process by the low-pass filter (LPF), where the chopping current by PWM is removed, and only the AC current corresponding to the vibration component of the engine E is left (see FIG. 12C). Subsequently, in step S35, the CPU 61 detects the vibration frequency of the engine E as the frequency of the AC current. At this time, of the vibration of the AC current, the CPU 61 stores the frequency in a range having a predetermined magnitude of amplitude as the roll resonance frequency in a memory of the electronic control unit U. The electronic control unit U uses the roll resonance frequency detected and stored to perform control at the time of engine start.

As described above, in a state where a constant current is supplied to the actuator 41, the vibration frequency of the engine E is detected from the frequency of a vibration waveform of a counter electromotive current of the actuator 41 superimposed on the constant current, and thus the vibration waveform of the superimposed current can be prevented from extending across the positive current side and the negative current side, thereby enabling the use of current detection means which can detect only one of the current in the positive direction and the current in the negative direction.

Although the embodiments of the present invention have been described in detail above, various design modifications can be made to the present invention without departing from the gist of the present invention.

For example, the active vibration isolation support device M is not limited to the one sealing a liquid, but a piezo element may be used instead.

In the embodiments, the roll resonance frequency is detected when the engine E stops, and the operation of the active vibration isolation support device M is controlled when the engine E starts; on the contrary, the roll resonance frequency may be detected when the engine E starts, and the operation of the active vibration isolation support device M may be controlled when the engine E stops.

Alternatively, the roll resonance frequency may be detected once every time the engine E starts and stops for a predetermined number of times, and the roll resonance frequency may be used to control the operation of the active vibration isolation support device M both when the engine E starts and when the engine E stops.

In the embodiments, the roll resonance frequency of the engine E is detected from the frequency of a current generated by the electromotive force of the actuator 41, but the roll resonance frequency may be detected by an acceleration sensor disposed in the engine E.

The embodiments exemplify the active vibration isolation support device M supporting the engine E for an automobile, but the active vibration isolation support device M in accordance with the present invention may be applied to engine supports other than of automobiles.

The embodiments explain the roll resonance as an example of the rigid body resonance, but the present invention may be applied to a resonance in a front-back direction, in a vertical direction, in a horizontal direction, in a yaw direction and in a pitch direction.

The embodiments exemplify the engine E as a vibrating body, but the vibrating body is not limited to the engine E.

In the embodiments, the electronic control unit U receives an individual control signal directly from a sensor, but may receive the signal from the engine ECU 10 or other control devices.

What is claimed is:

1. An engine natural vibration frequency detection method for detecting a natural vibration frequency of a rigid body resonance of an engine supported through an active vibration isolation support device to a vehicle body, the method comprising steps of:
   detecting the natural vibration frequency when the engine starts or stops;
   generating a current by an electromotive force of an actuator of the active vibration isolation support device which is excited by the engine when the engine starts or stops;
   detecting the natural vibration frequency from a frequency of the current; and
   in a state where a constant current is supplied to the actuator, detecting the natural vibration frequency from a frequency of a vibration waveform of a counter electromotive current superimposed on the constant current.

2. An active vibration isolation support device control method for controlling the active vibration isolation support device using the method according to claim 1, wherein the method comprises, when the engine starts or stops, suppressing the rigid body resonance of the engine by controlling the operation of the active vibration isolation support device based on the natural vibration frequency of the resonance.

3. The active vibration isolation support device control method according to claim 2, wherein the method comprises, based on the natural vibration frequency of the resonance detected when the engine stops, suppressing the rigid body resonance of the engine by controlling the operation of the active vibration isolation support device when the engine starts.

4. An engine natural vibration frequency detection method for detecting a natural vibration frequency of a rigid body resonance of an engine supported through an active vibration isolation support device to a vehicle body and an active vibration isolation support device control method for controlling the active vibration isolation support device using said engine natural vibration frequency detection method;
   said engine natural vibration frequency detection method comprising the steps of:
      generating a current by an electromotive force of an actuator that drives the active vibration isolation support device which is excited by the engine when the engine starts or stops, and
      detecting the natural vibration frequency from a frequency of the current;
   said active vibration isolation support device control method comprising the steps of:
      when the engine starts or stops, suppressing the rigid body resonance of the engine by controlling the operation of the active vibration isolation support device based on the natural vibration frequency of the resonance,
      based on the natural vibration frequency of the resonance detected when the engine stops, suppressing the rigid body resonance of the engine by controlling the operation of the active vibration isolation support device when the engine starts, and
      in a state where a constant current is supplied to the actuator, detecting the natural vibration frequency of the resonance from the frequency of the vibration waveform of the counter electromotive current superimposed on the constant current.

5. An engine natural vibration frequency detection method for detecting a natural vibration frequency of a rigid body resonance of an engine supported through an active vibration isolation support device to a vehicle body and an active vibration isolation support device control method for controlling the active vibration isolation support device using said engine natural vibration frequency detection method,
   said engine natural vibration frequency detection method comprising the steps of:
      generating a current by an electromotive force of an actuator that drives the active vibration isolation support device which is excited by the engine when the engine starts or stops, and
      detecting the natural vibration frequency from a frequency of the current,
      wherein the step of detecting the natural vibration frequency comprises, by using the electromotive force of the actuator that drives the active vibration isolation support device which is excited by the engine when the engine starts or stops, detecting as the natural vibration frequency, a natural vibration frequency of a roll resonance to be used when the engine starts or stops at a next time or thereafter;
   said active vibration isolation support device control method comprising the steps of:

when the engine starts or stops, suppressing the rigid body resonance of the engine by controlling the operation of the active vibration isolation support device based on the natural vibration frequency of the resonance, based on the natural vibration frequency of the resonance detected when the engine stops, suppressing the rigid body resonance of the engine by controlling the operation of the active vibration isolation support device when the engine starts, and in a state where a constant current is supplied to the actuator, detecting the natural vibration frequency of the resonance from the frequency of the vibration waveform of the counter electromotive current superimposed on the constant current.

6. An engine natural vibration frequency detection method for detecting a natural vibration frequency of a rigid body resonance of an engine supported through an active vibration isolation support device to a vehicle body and an active vibration isolation support device control method for controlling the active vibration isolation support device using said engine natural vibration frequency detection method, said engine natural vibration frequency detection method comprising the steps of:

generating a current by an electromotive force of an actuator that drives the active vibration isolation support device which is excited by the engine when the engine starts or stops, and detecting the natural vibration frequency from a frequency of the current;

wherein the step of detecting the natural vibration frequency comprises, by using the electromotive force of the actuator that drives the active vibration isolation support device which is excited by the engine when the engine starts or stops, detecting as the natural vibration frequency, a natural vibration frequency of a roll resonance to be used when the engine starts or stops at a next time or thereafter;

said active vibration isolation support device control method comprising the steps of:

when the engine starts or stops, suppressing the rigid body resonance of the engine by controlling the operation of the active vibration isolation support device based on the natural vibration frequency of the resonance, and in a state where a constant current is supplied to the actuator, detecting the natural vibration frequency of the resonance from the frequency of the vibration waveform of the counter electromotive current superimposed on the constant current.

7. An engine natural vibration frequency detection apparatus for detecting a natural vibration frequency of a rigid body resonance of an engine supported through an active vibration isolation support device to a vehicle body, comprising a control unit configured:

to detect the natural vibration frequency when the engine starts or stops;

to generate a current by an electromotive force of an actuator of the active vibration isolation support device which is excited by the engine when the engine starts or stops, and to detect the natural vibration frequency from a frequency of the current; and in a state where a constant current is supplied to the actuator, to detect the natural vibration frequency from a frequency of a vibration waveform of a counter electromotive current superimposed on the constant current.

8. An active vibration isolation support device control apparatus for controlling the active vibration isolation support device using the apparatus according to claim 7, wherein, when the engine starts or stops, the control unit suppresses the rigid body resonance of the engine by controlling the operation of the active vibration isolation support device based on the natural vibration frequency.

9. An active vibration isolation support device which is disposed between a vibrating body and a supporting body; and extends or retracts periodically by a control unit supplying a current to an actuator so as to suppress a vibration of the vibrating body from being transmitted to the supporting body, wherein the control unit uses a current detection unit to detect a counter electromotive current of an actuator excited by the vibrating body and to detect a vibration frequency of the vibrating body from a frequency of a vibration waveform of the counter electromotive current;

wherein, in a state where a constant current is supplied to the actuator, the control unit is operable to detect the natural vibration frequency from a frequency of a vibration waveform of the counter electromotive current superimposed on the constant current.

10. A vibrating body vibration frequency detection method for detecting a vibration frequency of a vibrating body using an active vibration isolation support device which is disposed between the vibrating body and a supporting body; and extends or retracts periodically by supplying a current to an actuator so as to suppress a vibration of the vibrating body from being transmitted to the supporting body, wherein the method comprises steps of detecting, by a current detection unit, a counter electromotive current of the actuator of the active vibration isolation support device excited by the vibrating body and detecting the vibration frequency of the vibrating body from a frequency of a vibration waveform of the counter electromotive current; and in a state where a constant current is supplied to the actuator, detecting the natural vibration frequency from a frequency of a vibration waveform of a counter electromotive current superimposed on the constant current.

* * * * *